(12) United States Patent
Paolilli et al.

(10) Patent No.: US 9,109,138 B2
(45) Date of Patent: Aug. 18, 2015

(54) OPTICALLY CLEAR BIAXIALLY ORIENTED POLYESTER FILM WITH ANTI-IRIDESCENT PRIMER LAYER

(75) Inventors: Tracy Paolilli, East Greenwich, RI (US); John Fitch, Middletown, RI (US)

(73) Assignee: TORAY PLASTICS (AMERICA), INC., North Kingstown, RI (US)

( * ) Notice: Subject to any disclaimer, the term of this patent is extended or adjusted under 35 U.S.C. 154(b) by 905 days.

(21) Appl. No.: 13/337,144

(22) Filed: Dec. 25, 2011

(65) Prior Publication Data
US 2013/0034710 A1 Feb. 7, 2013

Related U.S. Application Data

(60) Provisional application No. 61/514,280, filed on Aug. 2, 2011.

(51) Int. Cl.

| | |
|---|---|
| *B32B 7/02* | (2006.01) |
| *B05D 3/02* | (2006.01) |
| *C09D 175/04* | (2006.01) |
| *B32B 27/04* | (2006.01) |
| *G02B 1/111* | (2015.01) |
| *C08G 18/79* | (2006.01) |
| *G02B 1/10* | (2015.01) |

(Continued)

(52) U.S. Cl.
CPC ............... *C09D 175/04* (2013.01); *B32B 7/02* (2013.01); *B32B 27/08* (2013.01); *B32B 27/18* (2013.01); *B32B 27/308* (2013.01); *B32B 27/36* (2013.01); *C08G 18/797* (2013.01); *C08J 7/042* (2013.01); *C08J 7/047* (2013.01); *G02B 1/105* (2013.01); *G02B 1/111* (2013.01); *B32B 2255/10* (2013.01); *B32B 2255/26* (2013.01); *B32B 2264/10* (2013.01); *B32B 2307/40* (2013.01); *B32B 2457/12* (2013.01); *B32B 2457/20* (2013.01); *B32B 2590/00* (2013.01); *C08J 2367/02* (2013.01); *C08J 2467/00* (2013.01); *C08J 2475/04* (2013.01); *Y10T 428/24975* (2015.01); *Y10T 428/265* (2015.01)

(58) Field of Classification Search
None
See application file for complete search history.

(56) References Cited

U.S. PATENT DOCUMENTS

| 3,235,399 | A | 2/1966 | Martin, Jr. |
| 3,766,061 | A | 10/1973 | Mahler et al. |

(Continued)

FOREIGN PATENT DOCUMENTS

| EP | 0839643 A1 | 6/1998 |
| JP | 2004299101 A | 10/2004 |

(Continued)

*Primary Examiner* — Prashant J Khatri
(74) *Attorney, Agent, or Firm* — Jeffrey C. Lew

(57) ABSTRACT

A highly optically clear, composite film has a predominantly thermoplastic polyester base layer of A/B/C-layered structure and a polyester and polyurethane blend primer layer Preferably core layer B of the base layer is substantially particle-free polyester and outer layers A and C include organic and/or inorganic particles. The primer layer is crosslinked using a carbodiimide crosslinking agent. The primer layer and base layer composite can be laminated with a protective layer of primarily acrylic polymer for a solar control film. Functional additives, such as UV light blockers can be present in layers of the composite and solar control films. The primer layer combination of polyurethane and crosslinking by carbodiimide, provides the acrylic coated polyester solar control film with notably reduced iridescence and durable adhesion between polyester and acrylic layers in moist and warm service conditions.

9 Claims, 1 Drawing Sheet

(51) Int. Cl.
  *B32B 27/08* (2006.01)
  *B32B 27/18* (2006.01)
  *B32B 27/30* (2006.01)
  *B32B 27/36* (2006.01)
  *C08J 7/04* (2006.01)

(56) References Cited

U.S. PATENT DOCUMENTS

| | | |
|---|---|---|
| 4,103,050 A | 7/1978 | Laskin et al. |
| 4,177,099 A | 12/1979 | Radzwill |
| 4,265,957 A | 5/1981 | Severance et al. |
| 4,274,887 A | 6/1981 | Pogoda |
| 4,857,366 A | 8/1989 | Schumacher |
| 5,298,312 A | 3/1994 | Oyama et al. |
| 5,316,791 A | 5/1994 | Farber et al. |
| 5,368,943 A | 11/1994 | Baghdachi et al. |
| 5,776,548 A | 7/1998 | Rukavina et al. |
| 5,840,429 A | 11/1998 | Rukavina et al. |
| 5,852,514 A | 12/1998 | Toshima et al. |
| 6,018,902 A | 2/2000 | Gudermuth et al. |
| 6,191,056 B1 | 2/2001 | Vogt et al. |
| 6,200,650 B1 | 3/2001 | Emch |
| 6,279,983 B1 | 8/2001 | Biondo et al. |
| 6,706,387 B2 | 3/2004 | Butera et al. |
| 6,794,445 B2 | 9/2004 | Reusmann et al. |
| 6,887,526 B1 | 5/2005 | Arlt et al. |
| 7,150,923 B2 | 12/2006 | Goodrich et al. |
| 7,569,269 B2 | 8/2009 | Takada et al. |
| 2003/0215621 A1 | 11/2003 | Bermel |
| 2006/0252320 A1 | 11/2006 | Pause |
| 2008/0026209 A1 | 1/2008 | Grandhee |
| 2008/0038539 A1 | 2/2008 | Yokota et al. |
| 2008/0057297 A1 | 3/2008 | Hatakeyama et al. |
| 2009/0324956 A1* | 12/2009 | Otani et al. .............. 428/412 |
| 2010/0068531 A1 | 3/2010 | Gu et al. |
| 2010/0239868 A1 | 9/2010 | Takada et al. |
| 2010/0279088 A1* | 11/2010 | Naito et al. .............. 428/212 |
| 2010/0316852 A1 | 12/2010 | Condo et al. |

FOREIGN PATENT DOCUMENTS

| | | |
|---|---|---|
| WO | 2010045657 A1 | 4/2010 |
| WO | WO2011000525 A1 * | 1/2011 |

* cited by examiner

OPTICALLY CLEAR BIAXIALLY ORIENTED POLYESTER FILM WITH ANTI-IRIDESCENT PRIMER LAYER

This application claims the benefit of U.S. Provisional Application No. 61/514,280 filed Aug. 2, 2011.

FIELD OF THE INVENTION

The present disclosure is generally related to optically clear biaxially oriented polyester film with at least one primer layer, having excellent adhesive properties to acrylic coating material over the primer layer even under harsh conditions, such as high moisture environment. The polyester film also reduces iridescent appearance after the polyester film is coated with acrylic material such as hard coating. The polyester film may have UV blocking and weatherable properties and may be preferably used for window film, display film, outside clear label, outside signage and photo voltaic application.

BACKGROUND OF THE INVENTION

A commercially and technically important utility for biaxially oriented polyester films is serving as component of many articles such as food packaging, printing media, electrical insulation, optical and the other industrial uses. The thermal stability, dimensional stability, chemical resistance, relative high surface energy, optical clarity as well as cost effectiveness of biaxially oriented polyester films are beneficial for typical end use applications. Regarding optical clarity, biaxially oriented polyester films can be used for instance as a substrate of optical products such as window films, display parts, touch screen, eyewear, including visors, goggles, and spectacles, lenses, sunscreens, labels and photovoltaic materials. Typically applications will involve placing optically clear acrylic coating material onto the biaxially oriented polyester films.

Although, biaxially oriented polyester film, and acrylic coating each are optically clear, the composite film of biaxially oriented polyester film coated with acrylic material can have adverse optical properties. For example, the film can exhibit excessive iridescence. The refractive index ("RI") of an acrylic coating material can be different from the RI of a biaxially oriented polyester film, e.g. biaxially polyethylene terephthalate (PET) film that is about 1.66. The difference between these refractive indices causes optical interference of light rays reflected from the surface between the acrylic layer and the polyester layer. This interference produces a rippled iridescent appearance through the spectral reflectance of the acrylic material-coated polyester film. Iridescence on the acrylic material coated polyester film is very evident under spectral light of fluorescent lamps because such light has a sharp distribution of luminescence that interferes with the rippled spectral reflectance of the acrylic material coated polyester film.

Iridescence is reduced or does not occur if the film is hazy because light is scattered. Hazy film is not desirable for many optically clear end use applications. Furthermore, the use of fluorescent lighting in place of incandescent lighting is increasing due energy conservation efforts. Consequently, the iridescence of the acrylic material-coated polyester film can distort or block the view through the film or detract from the desired aesthetic appearance of the article comprising the film. Accordingly, the ability to reduce iridescence is gaining importance.

Another problem with the acrylic material-coated polyester films is adhesion between layers of acrylic material and the polyester layer. In general, biaxially oriented polyester film has highly crystallized surface that makes the polyester difficult to adhere to such acrylic material coating layer. To overcome this drawback, a primer layer is sometimes used between polyester and acrylic polymer layers to improve adhesion.

Japanese Patent Publication Number JP 2004-299101 of YOKOTA SUNAO et al., entitled "Transparent Laminated Film for Surface Protection" is directed to a transparent composite film with a 10-250 µm thick base layer of biaxially stretched polyester and a 3-20 µm thick hard coat layer of acrylic polymer providing at least 90% light transmission. The film is for laminating to a surface of an article, such as a flat panel display member, a nameplate, a window and the like, to protect the article from scratching or other damage.

US patent application 2008/0038539 of Yokota et al. discloses a composite film having a core layer sandwiched between outer layers to form a base polyester layer. A coating layer containing anti-iridescent material covers one side of the base polyester layer and an acrylic coating is disposed over the anti-iridescent coating layer. U.S. '539 discloses the effect achieving anti-iridescence by optimizing RI and the coating layer thickness to minimize infringement of reflection light which causes ripples of the spectral reflectance.

However, these technical references do not fulfill the needs of modern industries for less or no iridescence and more robust adhesion under very harsh condition such as moisture exposure. The disclosed films above have been found to provide a hard coat with only moderate adhesion to the base layer, especially after exposure to heat and moisture.

SUMMARY OF THE INVENTION

This invention relates to a highly optically clear, composite film having a predominantly thermoplastic polyester base layer and a primer layer of a polyester and polyurethane blend composition. The base layer preferably has an A/B/C layered structure with a substantially particle-free core layer B of polyester and outer layers A and C of polyester containing nonpolyester, organic and/or inorganic particles. The primer layer is preferably applied to the base layer from solution that is organic solvent-free and is crosslinked using a carbodiimide crosslinking agent. The primer layer and base layer composite can be laminated with a protective layer of primarily acrylic polymer, for example to obtain a solar control film. Various layers of the composite and solar control films can contain effective amounts of functional additives, such as UV light blockers. Polyurethane in the primer, especially in combination with crosslinking by the carbodiimide, provides the acrylic coated polyester base solar control film with notably reduced iridescence and durable adhesion between polyester and acrylic layers in moist and warm service conditions.

DETAILED DESCRIPTION OF THE INVENTION

Figure 1:
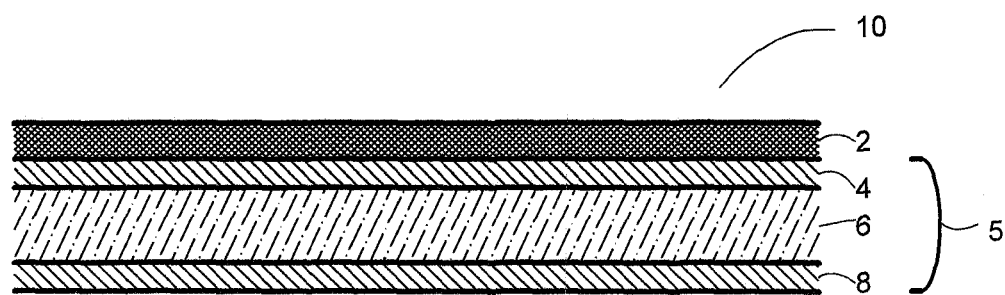
FIG. 1 is an elevation cross section view of a composite film according to an embodiment of this invention.
Figure 2:
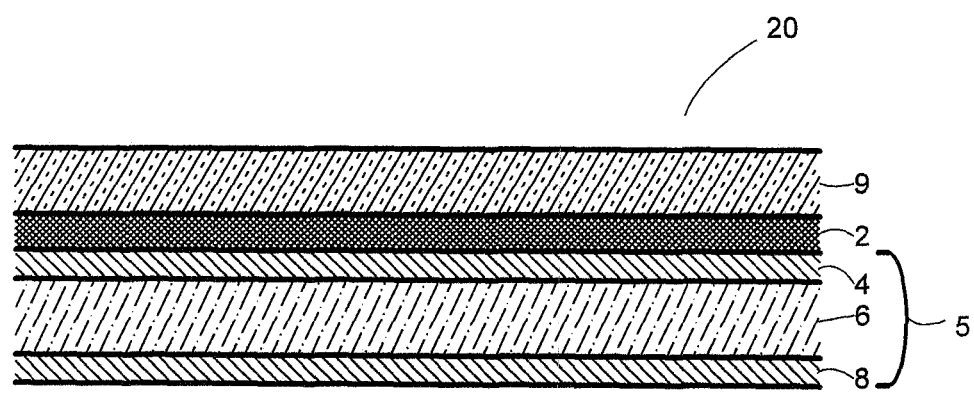
FIG. 2 is an elevation cross section view of a solar control film including the composite film of FIG. 1 and a protective layer according to another embodiment of this invention.

A basic embodiment of this invention is understood with reference to FIG. 1 showing a cross section of novel composite film 10. This composite film includes a base layer 5 and a primer layer 2. The base layer is preferably formed of three sublayers, namely core layer 6, and outer layers 4 and 8. Each of the core and outer layers is predominantly polyester and can include other components, such as "UV" (ultraviolet light) blocking additives and particles. In another embodiment shown in FIG. 2, a solar film 20 includes a protective layer 9 primarily of preferably an acrylic polymer. The protective layer 9 is positioned on the composite film in contact with the primer layer 2.

In the present invention, the primer layer contains polymeric binder as a major component of the primer layer. The polymeric binder may be selected from, but not limited to, polyester, acrylic, polyurethane or the mixture thereof. It is preferred to select polyester binder because its RI is similar to that of the polyester base layer and thus is helpful to reduce iridescence in the manner as described in US 2008/0038539. Also the polyester binder is very compatible with the base polyester layer to provide preferred adhesion, in general. A preferred raw material for the polyester binder is a 30% solids dispersion, in 2% propanol, aqueous solution commercially available under the name Eastek® 1200 (Eastman Chemicals Company, Kingsport, Tenn.). This polyester has inherent viscosity of 0.34-0.42, glass transition temperature (Tg) of 63° C. and softening point 65° C.

It now has been discovered that very small polyurethane particles, particularly inversely synthesized aliphatic type polyurethane, in the primer layer 2 provide excellent iridescence canceling. Without wishing to be bound by a particular theory it is thought that the polyurethane particle anti-iridescent component scatters light impinging on the film. The iridescence canceling performance is highly effective. Hence, without significantly increasing haze, iridescence normally observed with an acrylic polymer coated polyester film is reduced or substantially completely prevented. Consequently use of polyurethane particles in the primer layer controls iridescence and maintains excellent optical clarity and thus is different from conventional anti-iridescent techniques described in the prior art such as US 2008/0038539.

A traditional approach to reducing iridescence in composite film utilizes refractive index matching techniques. The refractive indices of the acrylic material layer and the base biaxially oriented polyester film layer are distinctly different. The refractive index difference generates iridescence, as mentioned above. Selecting a primer composition having a RI that matches and complements those of the two layers could reduce iridescence by canceling the effect of disparate refractive indices.

It is contemplated that low iridescence from the polyurethane according to this invention is caused by a light scattering phenomenon (without increasing haze) rather than or in combination with refractive index matching. This is remarkable because the polyurethane can be utilized at a particle size and concentration low enough to allow excellent optical clarity of the overall film yet provide good anti-iridescence performance. The implications of this theory include that a polyurethane fine particle dispersion in a primer layer can be utilized to reduce iridescence in a wide variety combinations of base layer and the over coating layer materials. Moreover, low iridescence can be obtained without constraining the primer layer to have a particular refractive index that complements the refractive indices of the other composite film layers, although the combination of the refractive index matching may be preferred.

The preferred iridescence-reducing component polyurethane particle is an inversely synthesized aliphatic polyurethane. The term "inversely synthesized aliphatic polyurethane" means that the polyurethane is formed by a process in which (i) non-aromatic organic polyisocyanate and non-aromatic organic polyol are reacted to form a polyurethane polymer, (ii) a neutralizing agent, such as a tertiary amine, is added to water to form an aqueous solution, and then (iii) the polyurethane polymer is added to and dispersed in the aqueous neutralizing agent solution. A preferred inversely produced polyurethane material is commercially available under the name Neorez R1010 (DSM NeoResins B.V., Waalwijk, Netherlands).

It should be understood that use of inversely synthesized aliphatic polyurethane particles interrelates successfully with several important performance parameters of optically clear and solar control films. In addition to exhibiting little or no iridescence, these films are called upon to have high cohesive strength for durability and to be highly transparent. All of these properties can be achieved by these polyurethane particles employed in a primer layer together with polymeric binder and a carbodiimide crosslinking agent in proper proportions. The polymeric binder provides structural integrity and serves as matrix for the dispersed phase of polyurethane particles. The crosslinking agent transforms the binder to a rigid network. If too little binder or crosslinking agent is present, the primer will be too weak to durably hold the protective layer to the base layer. Delamination can occur. The polyurethane particles cancel undesirable iridescence. If too little inversely synthesized aliphatic polyurethane particles are present, iridescence can occur. Conversely, if there is too much of binder, polyurethane or crosslinking agent, or the primer layer is too thick, the film can become excessively hazy and thus unsuitable for optical or solar control film utilities. The description and examples of this disclosure provide guidance for selecting relative amounts of the primer components for successful practice of this invention. The artisan of ordinary skill will be able to adjust proportions of primer components and primer layer thickness according to the principles set forth herein to effectively apply the invention without undue experimentation.

The desired particle size of the polyurethane particles within the primer layer is about 1 nm to about 100 nm, preferably about 1 nm to about 60 nm. If the particle size is larger than 100 nm, the coated film surface can develop a grainy appearance. Additionally, the haze value can exceed the less than 3% desired limit for the coated polyester film (i.e., the base layer/primer/acrylic polymer layer composite), thereby reducing the optical clarity. If the particle size is smaller than 1 nm, the anti-iridescing properties may not be achieved. The content of the polyurethane particles in the primer layer is about 0.1 to 2.5 wt %, preferably about 0.1 to about 1.5 wt %. If the content is less than 0.1 wt % there may not be enough particles to effectively reduce or eliminate iridescence. If the content is more than 2.5 wt %, the coated film surface may exceed a less than 3% haze value, thereby reducing optical clarity. The urethane particles are preferably uniformly dispersed within the primer layer. The primer layer should be of a consistent dry coating weight and thickness with adequate unagglomerated dispersed particles to sufficiently provide an optically clear coating with a haze value. Primer layer-coated base layer (i.e., without an acrylic polymer layer) of this invention has a haze value of less than 4%. The preferred thickness of the primer layer is about 0.03 to 0.15 µm, more preferably, 0.07 to 0.12 µm. If the thickness is less than 0.03 µm, the desired adhesiveness and anti-iridescence effect may not be achieved. If the thickness is more than 0.15 µm, then presence of the primer can detract from overall optical clarity and the desired anti-iridescence effect may not be achieved.

As another embodiment of this invention, great preference is given to strengthening the primer layer and the bond between polyester film layer and the acrylic polymer layer by crosslinking the primer layer. Crosslinking strengthens the primer layer by forming the polymeric binder component of the primer layer into a permanent, rigid, network structure. It also produces chemical links between the polymeric binder and the polyester base layer. Crosslinking can be accomplished during and/or after drying solvent from the wet primer layer. Typically a crosslinking agent is added to the primer composition to catalyze the reaction. Many conventional crosslinking agents for reacting polyurethane and polyester may be used, such as carbodiimide, melamine, aziridine, glyoxal, oxazoline and mixtures thereof.

It has been found that a carbodiimide crosslinking agent provides excellent adhesive strength while very effectively preserving the anti-iridescence property afforded by the polyurethane/polyester binder blend. Carbodiimides have the chemical formula $R_1N=C=NR_2$ in which $R_1$ and $R_2$ are hydrogen or hydrocarbon radicals. Additional benefits of using carbodimide crosslinker include improved adhesive bonding of film layers, useful potlife, low toxicity, improved chemical resistance and crosslinking at ambient conditions. A preferred carbodiimide crosslinking agent is Solucote® XL1 (DSM NeoResins B.V., Waalwijk, Netherlands). Preferably the crosslinking agent is added to the primer coating liquid and mixed to uniform concentration. The preferred content of the crosslinking agent in the primer layer is about 1 wt % to 5 wt %, more preferably, about 2 to 3 wt %. If the content is less than 1 wt %, the organic solvent resistance properties, the inorganic solvent resistance properties and the required adhesive strength of the primer layer will not be achieved. If the content is more than 5 wt %, excessive crosslinking can produce haze value of the base layer/primer layer film greater than 4%, thereby reducing optical clarity.

Inversely synthesized aliphatic polyurethane dispersion and the crosslinking agent are mixed with the polymeric binder dispersion in appropriate preselected ratios to form a primer coating liquid. The coating liquid can be applied to a surface of the base layer by conventional coating methods such as dip coating, doctoring, spraying, rod coating and the like. Rod coating is preferred. Following application, the primer coating liquid is dried by heating and low humidity ventilation to remove liquid dispersing medium (mainly water), and leave a solid content of the primer layer on the base polyester layer. Such coating processes can be done after the biaxially oriented polyester film is made, or continuously (i.e., in line) with the biaxially oriented polyester film fabrication. The in line method is preferred to reduce the number of steps and cost of coating.

Examples of polyester suitable to form the base of the biaxially oriented polyester film are, polyethylene terephthalate (PET), polyethylene naphthalate (PEN), polybutylene terephthalate (PBT), polyethylene isophthalate (IPET) and blends or co-polymers thereof. A preferred polyester is PET because of its good balance of cost and performance.

The base layer of biaxially oriented polyester film may have a mono layer structure or a multi layer structure such as A/B, A/B/A or A/B/C. A/B/A or A/B/C structures are preferred in which wherein the core layer B is a polymer layer substantially free of particles and layers A and C each independently can contain organic and/or inorganic particles. Core layer B should contain no particles to achieve the preferred optical clarity of at most about 3% haze value and more preferably at most 2%. The outer layers A and C may have desired slip agents such as organic and/or inorganic particles, as disclosed in US patent application 2008/0038539 hereby incorporated herein.

The biaxially oriented polyester film generally has a thickness of from 1 to 500 μm, preferably from 5 to 350 μm. A film thickness of 10 to 50 μm may be preferred for some applications, such as for solar window film use.

The biaxially oriented polyester film can be produced by any conventional method, such as sequential stretching or simultaneous stretching. In an example of the fabrication process, raw material polyester pellets and additives are fed to a melt processor, such as a mixing extruder. The molten material, including the additives, is extruded through a slot die and quenched on a chill roll, in the form of a substantively amorphous film. The film may then be reheated and stretched longitudinally and transversely or transversely and longitudinally, or longitudinally, transversely, and again longitudinally and/or transversely. Temperatures during stretching are generally above the Tg of the film polymer by about 10 to 60° C. Preferably, the longitudinal stretching ratio is from 2 to 6, more preferably from 3 to 4.5. Preferably, the transverse stretching ratio is from 2 to 5, more preferably from 3 to 4.5. Preferably, any second longitudinal or transverse stretching is carried out at a ratio of from 1.1 to 5. The first longitudinal stretching may also be carried out at the same time as the transverse stretching (simultaneous stretching). Heat setting of the film may follow at an oven temperature of about 180 to 260° C., preferably about 220 to 250° C. The film may then be cooled and wound up.

The biaxially oriented polyester film may contain other additives such as, but not limited to, UV stabilizer, hydrolysis resistant agent, optical brightener, frame retardant agent, anti-oxidation agent. Especially for outdoor applications such as solar window film or photo voltaic application, it is preferable that the polyester film contains UV stabilizer to protect the film itself and/or protect article behind the film from UV light. Various terms such as "UV light blocker" "UV blocking additive", "UV stabilizer", "UV absorber", "UV agent" and the like used herein are to be construed interchangeably as referring to components included the base layer to control the effect of ultraviolet light incident thereon.

Preferred UV absorbers include 2-hydroxybenzotriazoles, benzoxazinones and the triazines. A more preferred UV absorber is 2,4-bis-biphenyl-6-[2-hydroxy-4-(2-ethyl-hexyloxy)phenyl]-1,3,5-triazine in terms of the weatherability and UV resistance performance. The content of UV absorber may be 0.1 to 2 wt. %. Less than 0.1 wt. % is not enough to be effective, more than 2 wt. % may increase haze, yellow color, affect the mechanical properties of the film, and may create processing issues such as generating undesirable gaseous byproducts and causing migration to the surface (i.e., "blooming") of the UV absorber. Preferably, the polyester film includes 0.1 to 2 wt. % UV absorber; more preferably in the range of 0.5 to 1.5%.

The biaxially oriented polyester film with primer of this invention can be used as a substrate on which is deposited a coating of acrylic polymer as mentioned above and seen in FIG. 2. The acrylic polymer layer is preferred to be optically clear and primarily to provide a hard, strong, impact resistant barrier against physical and chemical attack from environmental conditions to which the desired application of this invention can be exposed in service. That is, such protective layer reduces damage to the film from scratching, denting, moisture, atmospheric-borne contaminants, dirt and permits wash-and-wipe cleaning of the exposed film surface. The preferred thickness of the acrylic polymer layer is 2 to 5 μm. Coating layer thickness exceeding 5 μm can adversely affect refractive index and cause iridescence. If the thickness is smaller than 2 μm, the chemical resistance properties of the acrylic polymer layer can be diminished.

Acrylic polymers for the protective layer of this invention have repeat units that are derivatives of acrylic acid or substituted acrylic acid. That is, the acrylic polymer is a polymer comprising polymerized units of the following formula (I)

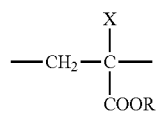

in which X=H, for an acrylic acid derivative, or an alkyl group for an alkyl acrylic acid derivative, such as $CH_3$ for a methacrylic acid derivative. Typically R is an alkyl group, a glycidyl group or a hydroxyalkyl group. Representative acrylic polymers include polymethyl methacrylate, polyethyl methacrylate, polybutyl methacrylate, polyglycidyl methacrylate, polyhydroxyethyl methacrylate, polymethyl acrylate, polyethyl acrylate, polybutyl acrylate, polyglycidyl acrylate, polyhydroxyethyl acrylate and mixtures of these. A protective layer of predominantly acrylic polymer typically has a refractive index of at most about 1.54, and frequently about 1.48 to about 1.54.

The acrylic polymer layer can include functional additives for specific purposes. Typical additives include antioxidants, impact resistance modifiers, surfactants, light blocking additives and the like. Preferably the acrylic layer for the desired application such as solar control films contain light blocking additives, particularly UV light blocking materials. The additives are usually present in minor quantities to avoid degrading optical clarity of the acrylic polymer layer. Typically the acrylic polymer layer contains a total of less than about 1 wt % of additives.

Frequently, coated polyester films are placed on products to provide a solar control function by blocking, absorbing and/or otherwise resisting the transmission of selective wavelengths of light. These phenomena are sometimes hereinafter collectively referred to as "light blocking". Ultraviolet light blocking is a significant utility for coated polyester base solar control films. PET, which is a most desired polyester, alone does not resist transmission of ultraviolet ("UV") light very well. UV light blocking is typically improved by placing a coat of an effective UV light blocking material on a PET core layer of a composite film. An example of such a material is a polymeric coating, for example, a hard coat such as an acrylic polymer that contains a uniformly dispersed UV light blocking composition. The hard coat also physically protects the PET base layer with enhanced impact resistance, abrasion resistance and like properties that lower the risk of damage from denting, scratching and similar other environmental assaults.

In one embodiment of the invention, the acrylic polymer layer includes UV light blocking materials. In that case, the acrylic polymer layer generally comprises greater than about 60 wt. %, preferably greater than about 80 wt. %, more preferably, greater than about 95 wt. %, and most preferably greater than about 98 wt. % of an acrylic polymer and 0 to about 2 wt % preferably about 0.05-1 wt. %, more preferably about 0.1-0.5 wt. %, and most preferably about 0.2-0.4 wt. % of ultraviolet light blocking component.

The acrylic polymer can be applied to the primer layer from a solution of the acrylic polymer dissolved in organic solvent. Although the organic solvent is substantially completely removed from the acrylic polymer after lamination, trace amounts of solvent can remain in the acrylic polymer layer. Not uncommonly, the compositions in the primer layer are soluble in organic media. Over time, the very slight but finite residual solvent in adjacent acrylic polymer layer can weaken the primer layer. After exposure to heat and moisture under environmental service conditions, cracking and flaking off of the weakened acrylic polymer layer can occur. A system for adhering acrylic polymer layer applied from organic solvent media onto optically clear solar control films is much needed in the industry. Therefore, superior organic solvent resistance of the primer layer is also desired and is achieved by crosslinking agent mentioned above.

The acrylic polymer layer can be laminated to the biaxially oriented polyester film by various known methods. The term "laminate" is used herein to mean the generic permanent joining of layers to form a composite structure and is not limited to any specific method. For example, the acrylic polymer layer can be preformed as a sheet and laminated onto the primer layer using heat and pressure. Acrylic polymer can also be extruded onto the primer layer. Preferably, the acrylic polymer can be deposited onto the primer layer from a solution. Examples of solution application methods include doctoring, spraying, painting, dipping, and rod coating techniques. Following application of solution, the solvent is removed by conventional techniques such as heat and/or vacuum treatments. A preferred material for making the acrylic polymer layer of this invention is an acrylic polymer with a UV cure intiator solution in methyl ethyl ketone and isopropyl alcohol solvent. The cure initiator is one which can be activated by exposure to UV radiation.

Ideally, all of the solvent is removed to leave a dry, e.g. hard coat of the acrylic polymer for the solar control film or display film such as touch screen. After the solvent removal step, it is not unusual for trace amount of the solvent to remain in the seemingly dry acrylic polymer layer. The primer according to this invention can withstand the solubilizing effect of the presence of such trace residual solvent. It is thus able to create a durable and strong bond between the acrylic polymer layer and the polyester base layer. Consequently, the acrylic polymer layer will resist cracking, chipping, flaking and peeling from the base layer for extended duration.

Among the contemplated embodiments of this invention are included the following.

1. Optically clear biaxially oriented polyester film comprising an anti-iridescent primer layer comprising, (A) polymeric binder as a major component of the primer layer, (B) 0.1-1.5 wt. % of inversely synthesized aliphatic polyurethane particle as iridescent reducing component, and (C) at least one crosslinking agent, wherein, the haze of the polyester film is 4% or less.

2. The optically clear biaxially oriented polyester film of contemplated embodiment 1. wherein the polymeric binder is polyester.

3. The optically clear biaxially oriented polyester film of contemplated embodiment 1. wherein thickness of the primer layer is 0.03-0.15 micrometer.

4. The optically clear biaxially oriented polyester film of contemplated embodiment 1. wherein the crosslinking agent is selected from carbodiimide, melamine, aziridine, glyoxal, oxazoline or mixture thereof.

5. The optically clear biaxially oriented polyester film of contemplated embodiment 1. wherein the crosslinking agent is carbodiimide.

6. The optically clear biaxially oriented polyester film of contemplated embodiment 1. which further comprises at least one UV absorber.

7. The optically clear biaxially oriented polyester film of contemplated embodiment 6. wherein the UV absorber is selected from 2-hydroxybenzotriazoles, benzoxazinones, triazines and mixture thereof.

8. The optically clear biaxially oriented polyester film of contemplated embodiment 6. wherein the UV absorber is 2,4-bis-biphenyl-6-[2-hydroxy-4-(2-ethyl-hexyloxy)phenyl]-1,3,5-triazine.

9. The optically clear biaxially oriented polyester film of contemplated embodiment 1. for a window film, optical, display, label or photo voltaic application.

10. This invention will be better understood with reference to the following examples, which are intended to illustrate specific embodiments within the overall scope of the invention.

TEST METHODS

Haze:

Haze of films was measured according to ASTM D1003 that determines the percent of transmitted light scattered at more than 2.5° from the incident light. A suitable instrument to measure haze is GARDNER HAZE-GARD PLUS No. 4725 hazemeter (BYK-Gardner USA). A haze value of 3% or less is considered acceptable, and 2% or less is preferred.

Iridescent Appearance Test:

Samples of primer layer-coated base layer composite films were coated with an acrylic polymer layer. A solution of acrylic polymer composition with a UV cure initiator in methyl ethyl ketone was drawn onto the composite film sample with a No. 2.5 mayer coating rod. The solution coated composite film was passed at a rate of 0.25 m/s (50 ft/min.) through a field of ultraviolet light radiation of 620,000 Watts/m² (400 Watts per square inch) to cure and thereby solidfy the acrylic polymer composition. The coated film was taped to a black & white lanetta card (9A). Then the surface of the hard coating was visually inspected under fluorescent lamp illumination and rated according to the scale below.

Rating 1 (Good): No iridescence observed.
Rating 2 (Acceptable): Weak iridescence observed.
Rating 3 (Unacceptable): Strong iridescence observed.

Acrylic polymer layer (hard coat) adhesion test (Spray Test):

A 12.7 cm×25.4 cm sample of composite film coated with an acrylic polymer layer as described in the Anti-Iridescent Appearance test method, above, was rolled up in a cylinder of approximately 2.5 cm diameter and secured with a paper clip. The rolled up film was exposed to temperature of 66° C. (150° F.) for 5 minutes. Thereafter the cylinder was unrolled and the surface of the film was visually inspected and rated according to the scale below.

Rating 1 (Good): No discoloration and no separation of acrylic polymer layer from composite film observed
Rating 2 (Acceptable): Discoloration but no separation of acrylic polymer layer from composite film observed
Rating 3 (Unacceptable): Discoloration and separation of acrylic polymer layer from composite film observed Acrylic Polymer Layer (Hard Coat) Adhesion Test (Boil Test):

A 12.7 cm×25.4 cm sample of composite film was coated with an acrylic polymer layer as described in the Anti-Iridescent Appearance test method, above. The acrylic polymer layer-coated sample was submerged in boiling water (100° C.) for 5 minutes. Thereafter the surface of the film was visually inspected and rated according to the same scale as in the Spray Test for Acrylic polymer layer adhesion.

Acrylic Polymer Layer (Hard Coat) Adhesion Test (Tape Test):

A 12.7cm×25.4 cm sample of composite film was coated with an acrylic polymer layer as described in the Anti-Iridescent Appearance test method, above. The acrylic polymer layer surface of the sample was pressed against Scotch Brand 810 adhesive tape to adhere the sample to the tape. The tape was peeled away rapidly from the tape in directions perpendicular and parallel to the tape. The sample and tape were visually inspected for transfer of hard coat acrylic polymer layer to the tape. The sample failed the test if any of the acrylic polymer layer transferred to the tape.

EXAMPLES

This invention is now illustrated by examples of certain representative embodiments thereof, wherein all parts, proportions and percentages are by weight unless otherwise indicated. All units of weight and measure not originally obtained in SI units have been converted to SI units.

Comparative Example 1

Making biaxially oriented polyester film with a primer layer (in line coating method):

Four masterbatch compositions, MB-A through MB-D, of additives were prepared by individually blending additive components with polyethylene terephthalate in the proportions shown in Table 1. MB-A, MB-B and MB-C were produced by adding the additive components to the reaction mass during polymerization of the PET. After synthesis, the PET with additive masterbatch compositions were pelletized. MB-D was made by charging the additive with PET pellets (0.65 inherent viscosity) to a twin screw extruder in which the masterbatch composition was melt blended and then pelletized.

TABLE 1

| | Additive | Average additive particle size (μm) | Additive Concentration (wt %) |
|---|---|---|---|
| MB-A | $CaCO_3$ | 1.1 | 1.0 |
| MB-B | $AlO_2$ | 0.1 | 1.5 |
| MB-C | $SiO_2$ | 2.0 | 1.0 |
| MB-D | UVA(*) | Not applicable(*) | 20 |

(*)ultraviolet light absorber 2,4-bis-biphenyl-6-[2-hydroxy-4-(2-ethyl-hexyloxy)phenyl]-1,3,5-triazine An outer layer composition for a polyester base layer film was made by mixing the masterbatch pellets with PET pellets of inherent viscosity 0.6 in the proportions shown in Table 2. The combination of pellets was dried to less than 100 ppm moisture content then melt-blended in an extruder.

TABLE 2

| Component | (wt %) |
|---|---|
| PET | 65 |
| MB-A | 22 |
| MB-B | 7 |
| MB-C | 2 |
| MB-D | 4 |

A core layer was formed by mixing 4 wt. % of MB-D pellets and 96 wt. % PET (inherent viscosity 0.65) pellets, drying the mixture to less than 100 ppm moisture content, then melt-blending the dried pellet mixture in an extruder. The outer layer and core layer melt streams were then continuously co-extruded at a temperature of 285° C. through a rectangular joining zone to form an A/B/A multi-layered melt structure. The multi-layered melt curtain was quenched on a casting drum at 20° C. to form a base layer film. The film was oriented in the machine direction by stretching to 3.3 times original length at 95° C. with a roller stretcher.

Formulation of the Primer Layer Composition:

A liquid primer composition was formed by combining and blending to uniform composition 19.3 parts weight per hundred ("pph") of a polyester binder dispersion, 0.04 pph of a leveling surfactant, 0.08 pph of an antifoam/leveling surfactant, 0.14 pph of an aqueous silica particle dispersion, and 2.62 pph of an aqueous crosslinking agent dispersion with 76.7 pph deionized water. The polyester binder dispersion was a 30 wt % solids polyester particle dispersion in 2% propanol, aqueous solution (Eastek® 1200, Eastman Chemicals Company, Kingsport, Tenn.). The leveling surfactant was an ethoxylated acetylenic diol (Surfonyl 440), and the antifoam/leveling surfactant was an ethoxylated acetylenic diol (Surfonyl 420). The silica particle dispersion was a 20 wt % aqueous dispersion of synthetic amorphous silica particles (Grace 703A, W. R. Grace Co.). The crosslinking agent was a 45 wt % aqueous dispersion of polycarbodiimide (Solucote XL1, (DSM NeoResins B.V., Waalwijk, Netherlands).

The liquid primer composition was coated with a Mayer rod coater onto one side of the base layer film. The primer solution was deposited at a rate of about 1.4 g/m² of base layer area that was calculated as effective to produce a primer layer of basis weight of 0.10 g/m², 0.1 μm thickness and 97.9 wt. % crosslinked polyester after drying. The wet coated film was transported through an oven, preheated at 110° C., and oriented in the transverse direction to 4.0 times original width at 110° C. The composite film was heat-set at 236° C. and relaxed (5%) using a chain driven stretcher. The completed film was then wound up. The biaxially oriented polyester film had an A/B/A thickness of 1.5/47/1.5 μm. The film was aged seven days at ambient temperature for full crosslinking to occur.

Application of an acrylic polymer layer on the primed polyester composite film, above:

A methyl ethyl ketone (MEK) based, acrylic hard coat containing a UV cure inflator was drawn onto the primed surface of the substrate polyester composite film above with a size No. 2.5 Mayer coating rod. The solution coated composite film was passed at a rate of 0.25 m/s (50 ft/min.) through a field of ultraviolet light radiation of 620,000 Watts/m² (400 Watts per square inch). The radiation exposure caused the crosslinking agent to crosslink the polyester binder while volatizing the MEK from the solution to produce an acrylic polymer coated polyester film (having a dry hard coat of acrylic polymer laminated onto the base polyester film above).

Samples of the above coated film were subjected to adhesion, haze and anti-iridescence appearance testing. Analytical results are presented in Table 3, below. The product did not meet low iridescence specification.

Example 2

The procedure of Comparative Example 1 was repeated except that the liquid mixture composition for the primer layer consisted of 19.267 pph polyester primer dispersion, 0.04 pph of leveling surfactant, 0.081 pph of antifoam/leveling surfactant, 0.144 pph of aqueous silica particle dispersion, 2.615 pph of aqueous crosslinking agent dispersion and 0.329 pph aqueous polyurethane particle dispersion combined with 76.455 pph deionized water. The aqueous polyurethane dispersion was a 32 wt % solids dispersion of particles less than about 100 nm size of inversely synthesized aliphatic polyurethane (Neorez R1010, DSM NeoResins B.V., Waalwijk, Netherlands). The primer layer drying conditions were same as in Comparative Example 1. The dry primer layer basis weight was again about 0.10 g/m² and dry primer layer thickness was about 0.1 μm. Composition of the dry primer layer was about 96.5 wt % crosslinked polyester and about 1.5 wt % of the inversely synthesized aliphatic polyurethane particles dispersed therein.

Samples of the above acrylic polymer coated polyester film were subjected to adhesion, haze value and anti-iridescence appearance testing. Analytical results shown in Table 3 indicate that the iridescent rating value of 1 to 2 was acceptable to good and adhesion and haze specifications were satisfied.

Comparative Examples 3 and 4

In Comp. Ex. 3, the procedure of Example 2 was repeated except that the content of the polyurethane particle in the primer layer was 9.0 wt %. In Comp. Ex. 4, the procedure of Example 2 was again repeated except that the content of the polyurethane particle in the primer layer was 0.22 wt %.

Evaluation Result

Analytical results are shown in Table 3. These examples show that excessive amounts of polyurethane particles can detract from optical clarity of the film (Comp. Ex. 3) and that insufficient polyurethane particles do not provide adequate iridescence canceling power (Comp. Ex. 4).

Comparative Example 5

The procedure of Example 2 was repeated except that primer solution was deposited onto the base layer at about 2.8 g/m² rate such that the primer thickness after drying was 0.2 μm. Analytical results shown in Table 3 indicate that excessive thickness of the primer layer adversely affects optical clarity although iridescence was canceled.

Comparative Examples 6 and 7

For Comp. Ex. 6, the procedure of Example 2 was repeated except that a glyoxal crosslinking agent (Freechem® 40DL from Emerald Performance Materials) was substituted for the carbodiimide crosslinking agent. Freechem 40DL is an aqueous solution of ethanedial which containing less than 0.2% residual acid. For Comp. Ex. 7 the same procedure as Ex. 2 was repeated except that melamine formaldehyde resin crosslinking agent (Cymel® 385 Cytec Industries, Woodland Park, N.J.) replaced the carbodiimide crosslinking agent. The amounts of crosslinking agent was same as Example 2. Analytical results are shown in Table 3. They reveal that the inversely synthesized aliphatic polyurethane and primer proportions as in Ex. 2 gave satisfactory iridescence and haze properties. However, replacement of carbodiimide by other crosslinking agents gave inferior Spray and Boil adhesion performance.

TABLE 3

| | Comp. Ex. 1 | Ex. 2 | Comp. Ex. 3 | Comp. Ex. 4 | Comp. Ex. 5 | Comp. Ex. 6 | Comp. Ex. 7 |
|---|---|---|---|---|---|---|---|
| Spray Adhesion | 1 | 1 | 1 | 1 | 1 | 2 | 3 |
| Boil Adhesion | 1 | 1 | 1 | 1 | 1 | 2 | 3 |
| Tape Adhesion parallel | Pass | Pass | Pass | Pass | Pass | Pass | Pass |
| Tape Adhesion perpendicular | Pass | Pass | Pass | Pass | Pass | Pass | Pass |
| Iridescence | 3 | 1-2 | 1-2 | 3 | 1-2 | 1-2 | 1-2 |
| Haze % | 1.37 | 1.7 | 3.53 | 0.85 | 6.5 | 1.22 | 1.35 |

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims. The entire disclosure of the US patents and patent applications referred in this application are hereby incorporated herein by reference.

What is claimed is:

1. A composite film comprising
   a core layer of substantially particle-free and optically clear polyester,
   (a) a first outer layer in direct contact with one side of the core layer,
   (b) an optically clear, iridescence-reducing primer layer in direct contact with a side of the first outer layer opposite the core layer, and
   (c) optionally, a second outer layer in direct contact with a side of the core layer opposite the first outer layer,
   in which each outer layer is optically clear, is independently about 0.5-7 μm thick and independently comprises inorganic particles dispersed uniformly in a polyester matrix,
   wherein the the optically clear, iridescence-reducing primer layer comprises inversely synthesized aliphatic polyurethane particles uniformly dispersed in a matrix of polyester crosslinked by a carbodiimide crosslinking agent.

2. The composite film of claim 1 in which both of the first outer layer and the second outer layer are present.

3. The composite of claim 1 which further comprises an optically clear protective layer in direct contact with a side of the primer layer opposite the first outer layer.

4. The composite of claim 3 in which the protective layer comprises greater than 50 wt. % of an acrylic polymer.

5. The composite of claim 4 in which the protective layer is a devolatized residue of a solution of the acrylic polymer dissolved in an organic solvent from which solution the organic solvent has been substantially removed.

6. The composite of claim 5 in which the protective layer comprises a trace amount of the organic solvent.

7. The composite of claim 6 in which the organic solvent is methyl ethyl ketone.

8. The composite of claim 5 in which the polyurethane particles are present in the primer layer at a concentration such that the composite exhibits haze of at most about 3%.

9. The composite of claim 8 in which thickness of the primer layer is about 0.03-0.15 μm.

* * * * *

UNITED STATES PATENT AND TRADEMARK OFFICE
CERTIFICATE OF CORRECTION

| | | |
|---|---|---|
| PATENT NO. | : 9,109,138 B2 | Page 1 of 1 |
| APPLICATION NO. | : 13/337144 | |
| DATED | : August 18, 2015 | |
| INVENTOR(S) | : Tracy Paolilli and John Fitch | |

It is certified that error appears in the above-identified patent and that said Letters Patent is hereby corrected as shown below:

In the Claims

In column 14, on line 10, "the the" should be changed to -- the --

Signed and Sealed this
Twenty-ninth Day of December, 2015

Michelle K. Lee
*Director of the United States Patent and Trademark Office*